No. 780,359. PATENTED JAN. 17, 1905.
J. W. LAMBERT.
FRICTION CLUTCH.
APPLICATION FILED APR. 7, 1904.
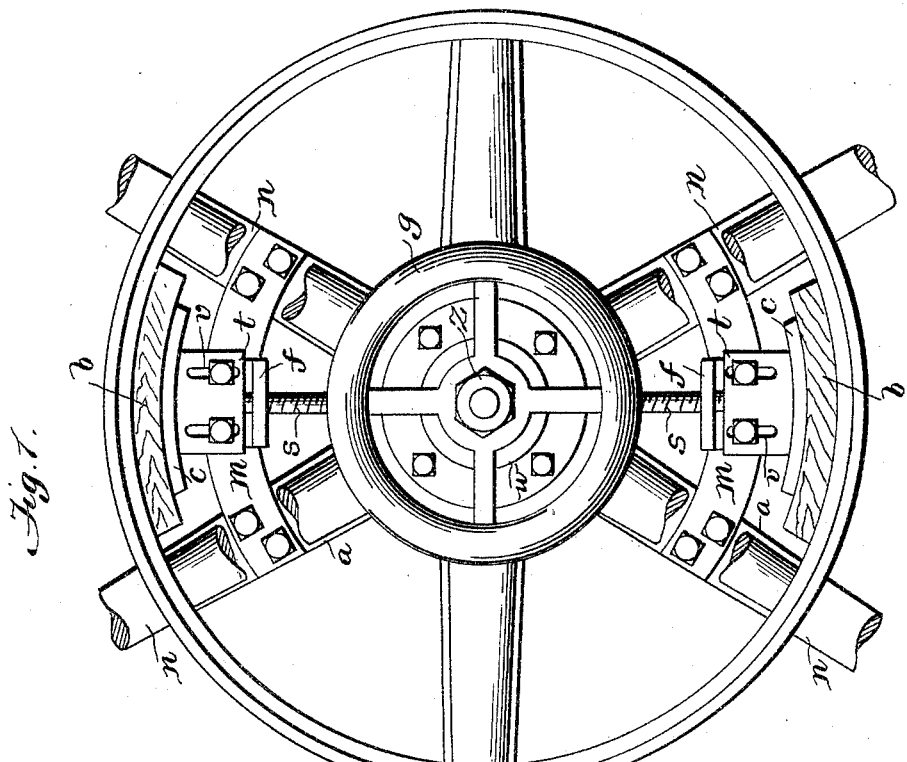
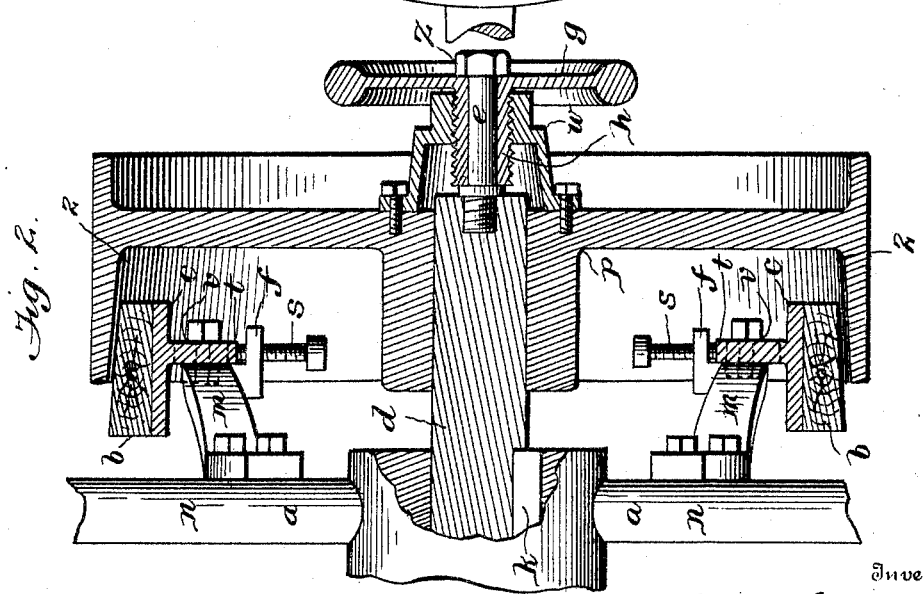
Witnesses
R. A. Boswell
Geo. M. Anderson
Inventor
John W. Lambert
By E. W. Anderson
his Attorney.

No. 780,359.   Patented January 17, 1905.

UNITED STATES PATENT OFFICE.

JOHN W. LAMBERT, OF ANDERSON, INDIANA.

FRICTION-CLUTCH.

SPECIFICATION forming part of Letters Patent No. 780,359, dated January 17, 1905.

Application filed April 7, 1904. Serial No. 202,045.

*To all whom it may concern:*

Be it known that I, JOHN W. LAMBERT, a citizen of the United States, and a resident of Anderson, in the county of Madison and State of Indiana, have made a certain new and useful Invention in Friction-Clutches; and I declare the following to be a full, clear, and exact description of the same, such as will enable others skilled in the art to which it appertains to make and use the invention, reference being had to the accompanying drawings, and to letters of reference marked thereon, which form a part of this specification.

Figure 1 is a side view of the invention. Fig. 2 is a vertical sectional view.

The invention relates to clutch-pulleys; and it consists in the novel construction and combinations of parts, as hereinafter set forth.

In the accompanying drawings, illustrating the invention, the letter $a$ designates a fly-wheel, which is rigidly attached to a shaft $d$ by a key $k$. Arms $m$ are fastened to the arms $n$ of the fly-wheel by means of screws.

$c$ is a shoe-plate connected to each of the arms $m$ by means of its flange $t$, which is slotted at $v$ for the passage of screws engaging the arms $m$. The shoe-plates are in this manner made adjustable, being secured in position after adjustment by the set-screws $s$, which are seated in lugs $f$ of said arms $m$ and engage the ends of the flanges of said shoe-plates.

On the shaft $d$ is the pulley $p$, which is loose on said shaft. An extension $e$ of the shaft carries a hand-wheel $g$, the hub $h$ of which is threaded to engage a threaded bell piece or bearing $w$, which is secured to the pulley. A nut $z$ serves to hold the hand-wheel on the extension $e$.

The pulley $p$ is provided with an inner circumferential bearing 2, extending around and forming the inside of its rim portion, and the bearing is usually beveled toward the edge of the rim, as shown.

$b$ is a rubber or friction shoe, usually of wood, which is carried by the shoe-plate and is designed to engage the inside rim-bearing 2 when the pulley is moved up to position.

The construction is such that when the shaft $d$ and wheel $a$ are in motion the pulley, its bell-piece, and the hand-wheel may be at rest. The operation is as follows: To start the pulley in motion, the hand-wheel is gradually turned to throw the pulley over to the rub-blocks or friction-shoes, which by gradual engagement with the inside rim bearing of the pulley start the latter slowly in rotation and gradually set it into full rotation as the friction-shoes come into full engagement with said inside rim-bearing. All the parts then rotate together in such a manner as to obviate wear or lost motion. To stop the pulley from rotating, the hand-wheel is turned in the opposite direction to draw the bell-piece and attached pulley away from the friction-shoes, thereby releasing the power from the pulley which will come to rest.

Having described the invention, what I claim, and desire to secure by Letters Patent, is—

In a friction-clutch, the combination with a power-shaft, an extension thereof, a wheel keyed on said shaft, and adjustable shoe-plates carried by said wheel, of a pulley loose on said shaft and having an inside rim-bearing, a threaded bearing attached to said pulley, and a hand-wheel loose on said extension and engaging said threaded bearing, substantially as specified.

In testimony whereof I affix my signature in presence of two witnesses.

JOHN W. LAMBERT.

Witnesses:
JAMES F. BOLEN,
STUART T. MCCOLLUM.